United States Patent [19]

Apostolos et al.

[11] Patent Number: 4,656,642
[45] Date of Patent: Apr. 7, 1987

[54] SPREAD-SPECTRUM DETECTION SYSTEM FOR A MULTI-ELEMENT ANTENNA

[75] Inventors: John T. Apostolos, Merrimack; Chester E. Stromswold, Nashua, both of N.H.

[73] Assignee: Sanders Associates, Inc., Nashua, N.H.

[21] Appl. No.: 601,453

[22] Filed: Apr. 18, 1984

[51] Int. Cl.⁴ .............................................. H04B 15/00
[52] U.S. Cl. ......................................... 375/1; 342/368; 342/375; 455/141; 375/102
[58] Field of Search ............... 455/132, 137, 141, 303, 455/304, 308; 375/1, 99, 100, 102; 343/368, 375, 423, 424

[56] References Cited

U.S. PATENT DOCUMENTS

| | | | |
|---|---|---|---|
| 2,954,465 | 9/1960 | White | 455/146 |
| 3,681,695 | 8/1972 | Cease et al. | 455/303 |
| 3,714,573 | 1/1973 | Grossman | 343/386 |
| 3,766,477 | 10/1973 | Cook | 375/1 |
| 3,815,135 | 6/1974 | Martin et al. | 343/424 |
| 3,824,595 | 7/1974 | Hall | 343/424 |
| 3,900,879 | 8/1975 | Lewinter | 343/423 |
| 3,916,313 | 10/1975 | Lowry | 375/1 |
| 3,924,236 | 12/1975 | Earp et al. | 343/16 R |
| 4,017,798 | 4/1977 | Gordy et al. | 375/1 |
| 4,027,247 | 5/1977 | Aranguren | 455/137 |
| 4,041,391 | 8/1977 | Deerkoski | 375/1 |
| 4,065,771 | 12/1977 | Gulick et al. | 343/371 |
| 4,161,733 | 7/1979 | Piesinger | 375/1 |
| 4,247,939 | 1/1981 | Stromswold et al. | 375/1 |

Primary Examiner—Benedict V. Safourek
Attorney, Agent, or Firm—Louis Etlinger; Stanton D. Weinstein

[57] ABSTRACT

In a spread-spectrum direction-finding system, the outputs of the several antenna elements (10a–d) are progressively translated in frequency by a chirped local oscillator (14) and mixers (12a–d) and applied to a two-dimensional dispersive filter (18), which time compresses the results of single-frequency components in the antenna-element outputs to narrow pulses. Limiters (24a–d) remove any strong narrow-band components that are compressed by the dispersive delay line (18) so that further processing to detect a spread-spectrum signal is not degraded by the presence of narrow-band signals. The use of a common two-dimensional delay line (18) to provide the time compression avoids the need to maintain phase tracking among a plurality of separate parallel one-dimensional dispersive delay lines.

14 Claims, 5 Drawing Figures

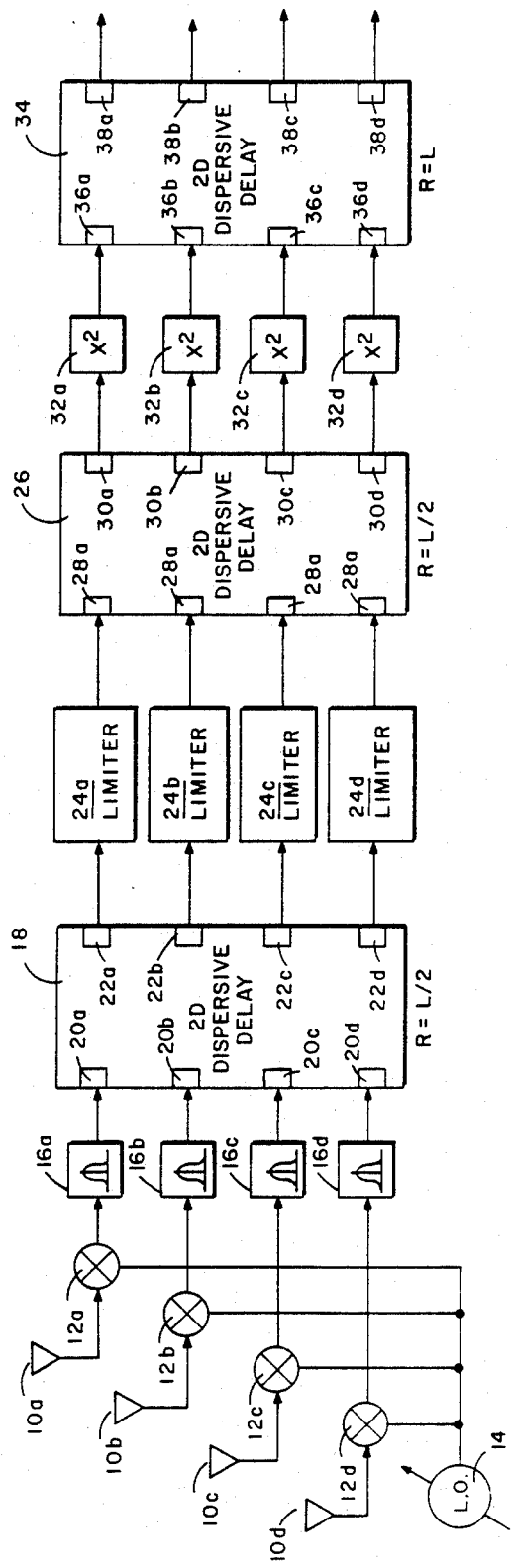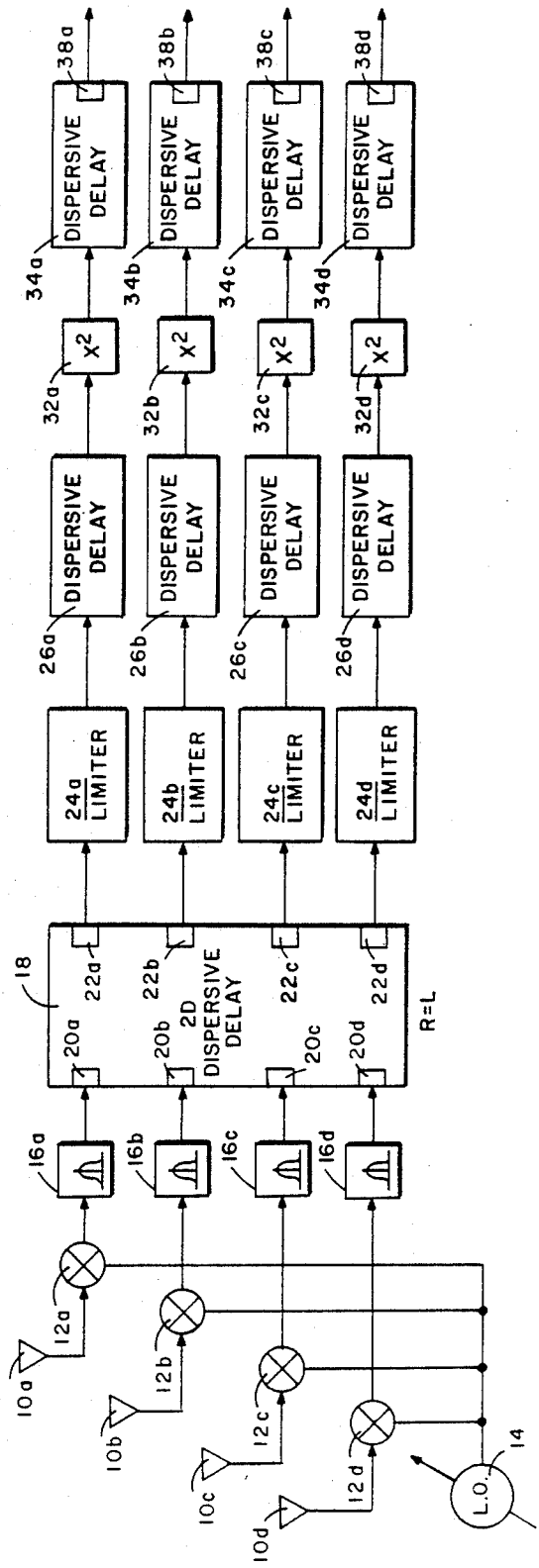
FIG. 1
FIG. 2

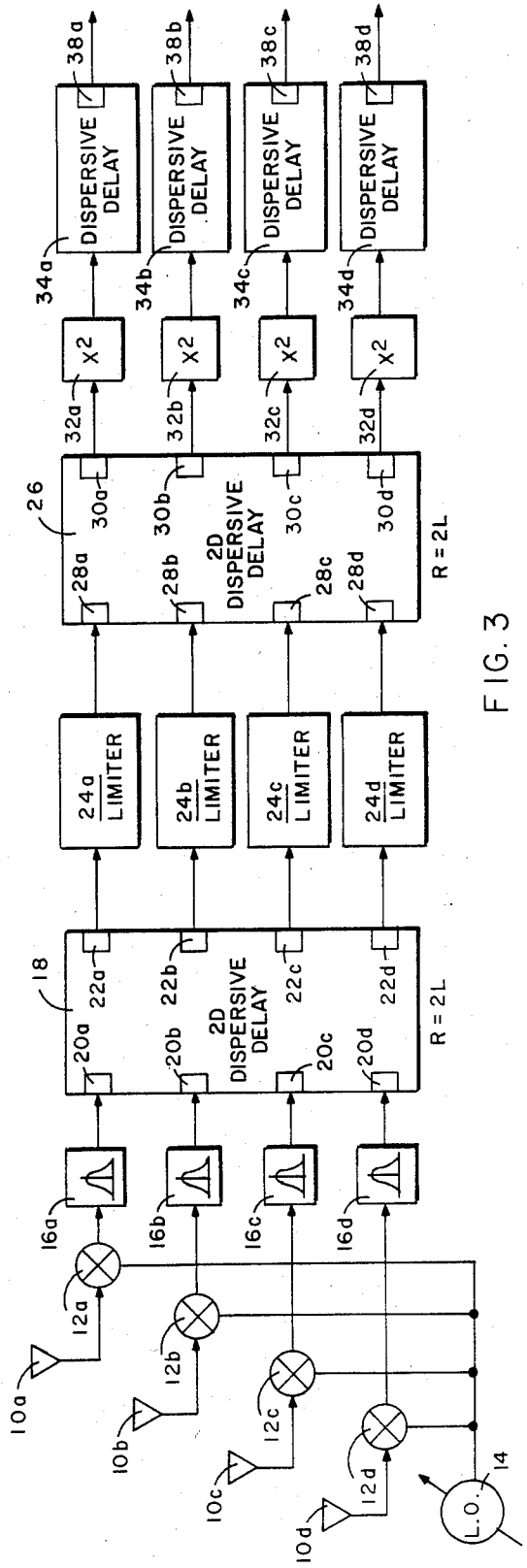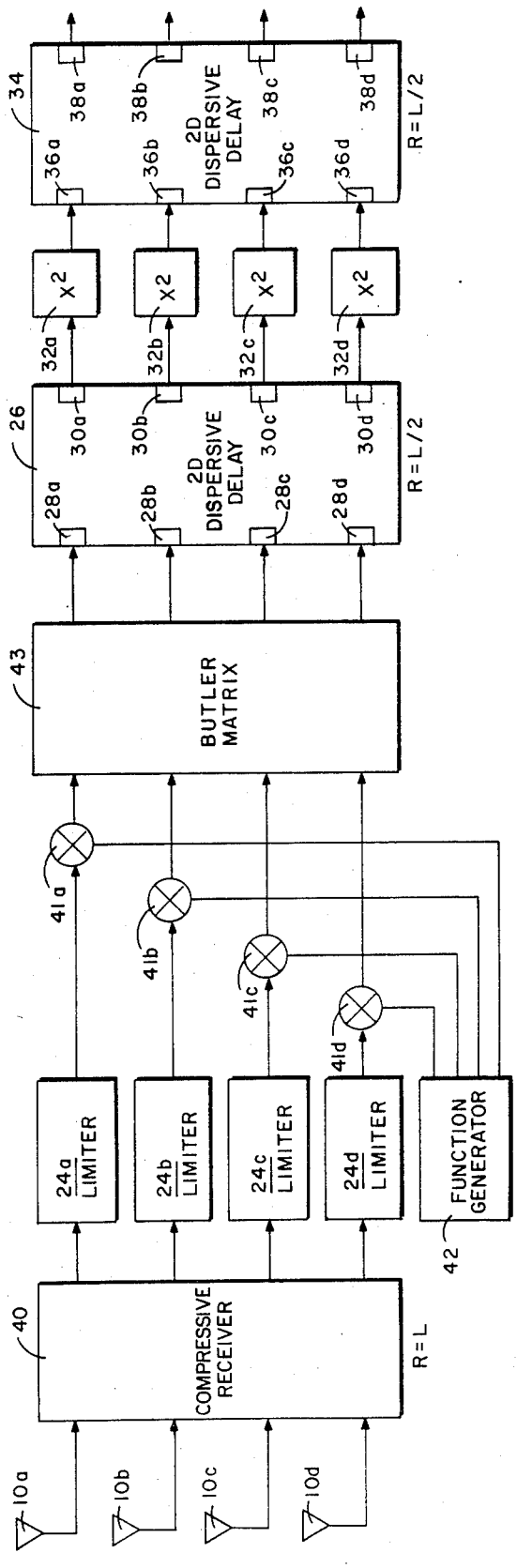
FIG. 3
FIG. 4

SPREAD-SPECTRUM DETECTION SYSTEM FOR A MULTI-ELEMENT ANTENNA

BACKGROUND OF THE INVENTION

The present invention is directed to receiver systems for detecting spread-spectrum signals in the outputs of a multi-element antenna system. It is particularly applicable to systems, such as direction-finder and other high-gain arrangements, in which the phase relationships between the outputs of the individual elements are critical.

Spread-spectrum signals are used for secure communications. In this type of signal, the information is spread throughout a broad frequency band and is typically buried in ambient noise and signals from other sources. The frequency spreading is accomplished by phase modulating a carrier in discrete shifts, typically of 180° or of various multiples of 90°, in a pseudo-random fashion. This pseudo-random modulation eliminates the spectral line at the carrier frequency, and it occurs at a rate that is high enough to spread the frequency content of the original signal throughout a wide range so that the bandwidth of the resultant spread-spectrum signal is as much as twenty percent or more of the carrier frequency. If the pseudo-random series of phase changes is known at a receiving station, it is possible to "squeeze" the spread-spectrum signal back into a narrow-band signal by reversing the phase shifts that originally caused the signal spectrum to be spread. This raises the signal out of the noise and makes it possible to detect it.

A method that we invented for detecting the presence of a spread-spectrum signal without knowing the pseudo-random shift pattern in advance is described in our U.S. Pat. No. 4,247,939 for a Spread Spectrum Detector. That patent describes the mixing of the received signal with the output of a swept-frequency, or chirped, local oscillator, squaring the result, and applying the squared signal to a dispersive delay line that has a linear relationship of delay to frequency. The relationship is such that the ratio of frequency difference to the associated difference in delay is twice the time rate of frequency change of the chirped oscillator. It is twice the chirped-oscillator rate because the squaring step doubles the frequency of the mixed signal.

This system acts as a special type of compressive receiver, first compressing the spread-spectrum signal in frequency by squaring it and then compressing the frequency-compressed signal in time by operation of the dispersive delay line. The result of the frequency and time compressions is to produce an output signal from the delay line in which the result of the spread-spectrum signal is a short-duration pulse that occurs at a time during the chirp-oscillator sweep that is indicative of the center frequency of the spread-spectrum signal. Concurrently, the received signal, without mixing with the chirp signal, may be squared and applied to a narrow-band filter that is set to the frequency indicated by the time at which the output pulse occurs. The output of this filter may then be demodulated or subjected to other processing.

It will be appreciated that the presence of strong narrow-band signals in the input of the squaring circuit can seriously degrade its performance. Accordingly, our above-mentioned patent discloses the use of a device for reducing the contributions of narrow-band signals in the input of the squaring circuit. In one version, a contiguous comb filter receives the input signal and divides it into contiguous, narrow frequency bins, frequency components falling within the respective bins appearing at separate comb-filter output ports. Any spread-spectrum signal is distributed among the many comb-filter output ports and contributes only minimally to any individual output. A strong narrow-band signal, however, will appear principally in only one or two of the outputs. Accordingly, individual amplitude limiters at the output ports of the comb filter can restrict the signal contributions of strong narrow-band signals without appreciably affecting the spread-spectrum content. The individual limiter outputs are then added back together, applied to the squaring circuit, and processed as previously described.

A more elegant approach to minimizing the effects of narrow-band signals is also described in our earlier patent. In this approach, the input signal is applied to a compressive receiver, which compresses narrow-band signals in time so that the compressive-receiver outputs resulting from different-frequency narrow-band signals are separated in time. Accordingly, a single limiter can be used to minimize the effects of narrow-band signals of all frequencies within the compressive-receiver frequency band. The limiter output is applied to a dispersive delay line whose relationship of delay to frequency is the reverse of that in the compressive receiver, so the compressed components are re-expanded before they are applied to the squaring circuit. The processing then proceeds in the manner described above.

The present invention is directed to the use of these principles on the outputs of a multi-element antenna array. Such arrays are used to achieve high gain or to perform direction finding. In principle, application of the teachings of our earlier patent to multi-element arrays can be fairly straightforward; it is only necessary to process each of the plurality of antenna-element outputs in the manner described in our earlier patent for a single-element output.

To carry out such a conceptually straightforward system, however, significant effort must be directed to preserving the information contained in the phase relationships among the element outputs. Since the directionality and direction-finding accuracy of a multi-element antenna depend on the phase relationships between the signals from the various antenna elements, any difference between the phase shifts experienced by different element outputs can lead to significant system errors. This is particularly of concern when minimization of the contribution of strong narrow-band element-output components involves the use of compressive receivers; discrepancies in the delays associated with different dispersive delay lines are a potential source of phase error.

The practical problem presented is thus to ensure that the phase shift experienced by the output of a given element during the compression step tracks the phase shifts experienced by the outputs of the other elements of the array during the same step.

SUMMARY OF THE INVENTION

We have solved this problem by using a single two-dimensional dispersive delay line to provide the prelimiting compression of all of the antenna-element outputs. Use of a single two-dimensional delay line permits the contributions of all of the antenna elements to pass through a common delay-line medium; that is, they are superimposed on each other while they travel through the delay line. As a result, the phase shifts experienced by the signals resulting from all of the antenna elements track each other, and the direction information in the relative phases is not degraded. In some embodiments of the invention, in fact, the two-dimensional delay line itself performs much or all of the processing of the direction information.

At least one of the outputs of the two-dimensional delay line is applied to a limiter associated with it, and that limiter reduces the contributions of strong narrow-band signals to that output. The resultant limited signal from each limiter is applied to an associated power-law circuit, as our previous patent teaches, and the power-law output is subjected to whatever further processing is needed in the particular application.

In this way, phase tracking among the outputs of the various antenna elements occurs automatically, and the need for expensive delay-line matching and temperature maintenance is largely eliminated.

BRIEF DESCRIPTION OF THE DRAWINGS

These and further features and advantages of the present invention are described in connection with the accompanying drawings, in which:

FIG. 1 is a block diagram of an embodiment of the present invention employed with a linear antenna array;

FIGS. 2 and 3 are block diagrams of alternate embodiments for processing the outputs of a linear antenna array;

FIG. 4 is a block diagram of a system for processing the outputs of a circular antenna array.

DETAILED DESCRIPTION OF THE PREFERRED EMBODIMENTS

Figure 5:
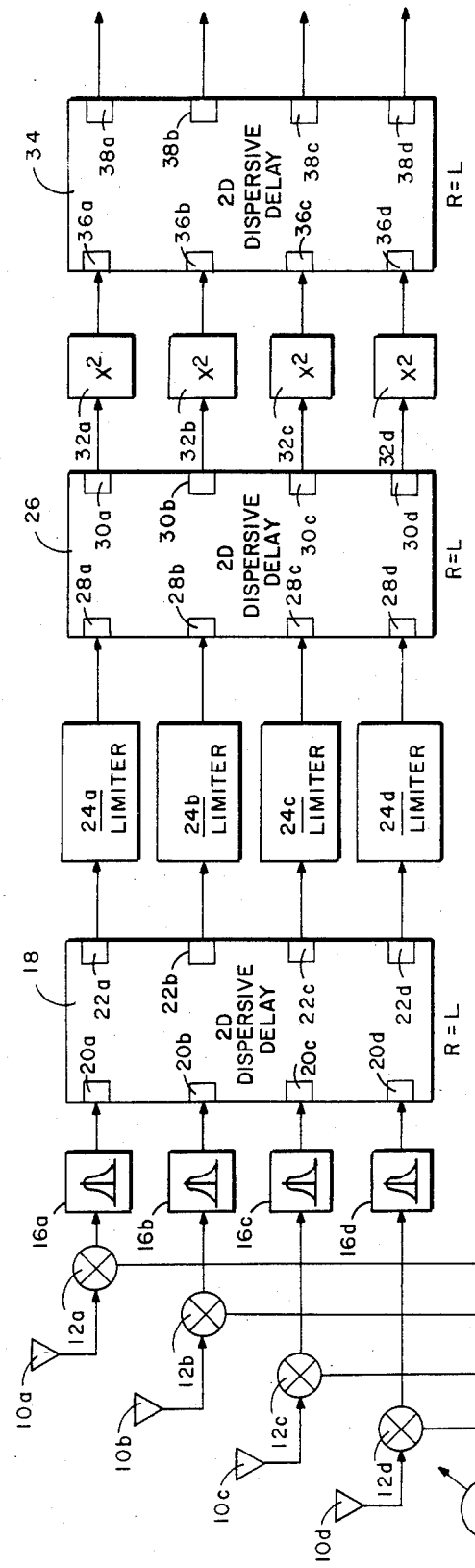
FIG. 5 is a block diagram of an embodiment that is particularly beneficial for processing the outputs of a linear array having a large number of antenna elements.

FIG. 1 illustrates a system for detecting the frequencies and directions of several spread-spectrum signals simultaneously. This system employs a linear array of antenna elements $10a-d$. The outputs of the antenna elements are fed to respective mixers $12a-d$, in which they are translated in frequency by mixing with the output of a common linearly swept local oscillator 14. The consequence of this mixing is that a continuous-wave signal at a given frequency is converted to a signal whose frequency is repeatedly swept through a range of frequencies. The resultant signals are applied to weighting filters $16a-d$. Each of the filters $16a-d$ has a frequency response selected for its ability to cause single-frequency mixer-input signals to result in narrow pulses at the output of a linear dispersive delay line 18 that receives the filter outputs. Typically, that frequency response is Gaussian. Each of the filters $16a-d$ has the same center frequency and bandwidth, although there typically is amplitude weighting among them.

As those skilled in the art will recognize, the bandwidth of the filters $16a-d$ is usually about half the range of the chirped oscillator 14. Thus, the mixer outputs caused by two different single-frequency antenna-output components whose frequency difference is less than the filter bandwidths begin and end at different times, but their durations cause them to overlap in time. For a limiter to be able effectively to suppress the filter outputs resulting from strong narrow-band components of the antenna outputs at all frequencies within the compressive-receiver bandwidth, those filter outputs must be segregated in time so as to avoid the generation of intermodulation products of the outputs. This is the function of the two-dimensional dispersive delay line 18.

The delay introduced by the delay line 18 is a linear function of frequency. The difference in frequency for a given difference in delay-line delay is the negative of the rate of change of frequency translation with respect to time in the mixers $12a-d$. As a result, an antenna-output frequency component lasting throughout a sweep of the local oscillator 14 results in a pulse at the output ports $22a-d$ that lasts for a very small fraction of the duration of a local-oscillator sweep. The time at which the pulse occurs depends on the frequency of the antenna component that gives rise to it, so pulses resulting from different frequency components are separated in time. If there are any strong narrow-band signals in the outputs of the antenna elements, they result in delay-line output pulses that individually rise above the noise. Limiters $24a-d$ remove all of the signal above a threshold that is greater than the expected noise level. They may be arranged additionally to short-circuit the delay-line output completely when its amplitude is above that threshold. The limiters thus excise those segments of the filter output that result from strong narrow-band signals received by the antenna elements $10a-d$.

At this point, a further discussion of the two-dimensional delay line 18 is in order. Delay line 18 has separate input ports $20a-d$ corresponding to the separate antenna elements $10a-d$, and there is a transducer at each of these ports to introduce sonic signals into the delay-line medium. Although the transducers are separate, they are on a common delay line, and all their signals propagate throughout substantially the entire body of the delay-line medium, being superimposed on each other within the delay line. The result is that the delay characteristics experienced by the signal in delay line 18 resulting from one antenna-element output are substantially identical to those experienced by the signals that result from all of the other antenna-element outputs.

However, the signals at output ports $22a-d$ are not identical to each other. The delay line is a beam-forming delay line similar to those employed in more-conventional two-dimensional compressive receivers. In such receivers, the input edge of the delay line has a radius of curvature equal to the length of the delay line to position the focal line at the output edge of the delay line. This results in a signal pattern at the output edge that in effect is a spatial Fourier transform of the signal pattern at the input edge. In delay line 18 of the FIG. 1 embodiment, however, the radius of curvature R at the input end is half the length L of the delay line. The signal pattern at the input ports $20a-d$ is thus Fourier transformed at the longitudinal center of the delay line and then disperses again to form a pattern at the output edge that is the reverse of the input pattern. As a result, the signal at output port $22d$ depends on the signal at input port $20a$ and is substantially independent of the other inputs. Similarly, the signals at output ports $22a$, $b$, and $c$ depend almost exclusively on the signals at input ports $20d$, $c$, and $b$, respectively.

Since individual delay-line outputs depend almost exclusively on individual associated delay-line inputs, the effect of employing the two-dimensional delay line 18 is in principle the same as that of employing parallel one-dimensional dispersive delay lines. As a practical matter, however, use of the two-dimensional delay line provides a significant advantage: it automatically keeps the phase shift between ports 20a and 22d, for example, equal to that between ports 20d and 22a. This eliminates the need to match separate parallel delay lines and to employ an elaborate oven to keep their temperatures identical.

As was stated above, the limiter circuits 24a–d remove the contributions of strong narrow-band signals. The outputs of these limiter circuits are fed to a further two-dimensional delay line 26. Two-dimensional delay line 26 is the same as two-dimensional delay line 18 except that its relationship of delay to frequency is exactly the reverse of the delay-frequency relationship of delay line 18. Accordingly, delay line 26 re-expands the components that were compressed in delay line 18 to enable single limiters to perform the limiting function throughout the frequency spectrum. The outputs of delay line 26 are thus the same as the inputs to delay line 18 except that they no longer have contributions from strong narrow-band components.

The outputs of the second delay line 26 are applied to power-law circuits 32a–d. The illustrated embodiment is arranged to detect signals generated by pseudo-random phase shifts of 180°, so the power-law circuits 32a–d are squaring circuits. As was explained in our earlier patent, squaring a spread-spectrum signal that was generated by 180° phase shifts causes it to be compressed in frequency to become a narrow-band signal whose frequency is twice the center frequency of the spread-spectrum signal. Similarly, if a spread-spectrum signal is squared after it has been progressively translated in frequency by mixing with the output of a chirped local oscillator, the result is the same as though a narrow-band signal had been progressively swept at twice the chirp rate.

To time compress the result of the spread-spectrum signal and thus raise it out of the noise, therefore, the outputs of the squaring circuits 32a–d are applied to a dispersive delay line 34 whose ratio of frequency difference to delay difference is twice the chirp rate. Thus, if progressively translated spread-spectrum signals are present at any of the input ports 36a–36d of the final delay line 34, they cause pulses at one or more of the output ports 38a–38d of that delay line.

If signals generated by pseudo-random phase shifts of multiples of 90°—rather than phase shifts of 180° only—were to be detected, the power law circuits 32a–d would be fourth-power circuits, and the ratio of frequency difference to delay difference in delay line 34 would be four times the chirp rate.

The position of the output port 38 at which a resultant pulse appears is an indication of the direction of the source of that signal. The reason for this is that, unlike the other two two-dimensional delay lines 18 and 26, the geometry of delay line 34 is such that its focal line is at its output edge. The signals at the input ports 36a–d that result from a given frequency component in the outputs of the antenna elements 10a–d therefore interfere constructively at a point in the output edge of delay line 34 whose position is determined by the spatial frequency of that component in the ensemble of output signals from the antenna elements 10a–d. Since the time during a sweep at which a pulse occurs indicates the center frequency of the spread-spectrum signal that gave rise to it, the angle of incidence of the signal can be determined by computing arcsin ($cf_s/f_t$), where $f_s$=spatial frequency, $f_t$=temporal frequency, and c=the speed of light. This simultaneous temporal- and spatial-frequency determination is accomplished without the need for elaborate measures for ensuring phase tracking among the signals resulting from the various antenna-element outputs; since the signals share a substantially common path through the two-dimensional delay lines 18, 26, and 34, phase tracking occurs automatically.

The direction determination performed in two-dimensional delay line 34 of FIG. 1 can be performed earlier in the process, as FIG. 2 indicates. In FIG. 2, circuit elements corresponding to those of FIG. 1 bear the same reference numerals, and a description of their common functions will not be repeated. However, some of the similar elements have differences that enable the embodiment of FIG. 2 to carry out the direction-information processing at an earlier stage.

Specifically, the delay line 18 of FIG. 2 differs from the similarly numbered delay line of FIG. 1 in that its focal line is at the output edge of the delay line, not at its longitudinal center. Delay line 18 of FIG. 2 is thus like delay line 34 of FIG. 1; the position of the port 22a, b, c, or d at which a given component appears is an indication of the spatial frequency in the antenna-element outputs of the components that gave rise to it. As was mentioned above, spatial frequency is an indication of bearing angle if temporal frequency is known.

Like the corresponding delay line 18 of FIG. 1, delay line 18 of FIG. 2 performs time compression of temporal-frequency components, so two-dimensional delay line 18 segregates components according to both temporal and spatial frequency, and the limiters 24 of FIG. 2 remove strong narrow-band components of all frequencies, just as the limiters 24 of FIG. 1 do. Since the direction processing takes place in the first delay line 18, however, it is not necessary for the further processing to take place in a common delay line. Signal re-expansion after the limiting step in FIG. 2 can thus be performed in separate one-dimensional delay lines 26a–d. This step is followed by squaring in circuits 32a–d, which are the same as the similarly numbered circuits of FIG. 1. The squaring is followed by compression in delay lines 34a–d, which perform in separate parallel one-dimensional delay lines the time compression performed by two-dimensional delay line 34 of FIG. 1. They do not perform the direction processing, however, since that has already occurred. Accordingly, the outputs from ports 38a–d of FIG. 2 are roughly the same as those from correspondingly numbered ports of FIG. 1.

Although the outputs of the circuit of FIG. 2 are roughly the same as those of the circuit of FIG. 1, they are likely, as a practical matter, to be more satisfactory than the FIG. 1 outputs, at least in systems in which the number of antenna elements is not large. The signal-to-noise ratio of the signals presented to the limiting and squaring circuits in FIG. 2 is greater than that in FIG. 1 because, since the direction processing in FIG. 2 occurs before the limiting step has been performed, the limiting and squaring circuits benefit from the array gain. That is, the results of narrow-band signals from a given source are typically concentrated in one or two channels and thus stand higher above the noise in the FIG. 2 limiter inputs than they do in the FIG. 1 limiter inputs, in which they are distributed among all of the channels. The limiting function can thus be more effective in the FIG. 2 embodiment. Similarly, the spread-spectrum signal at the squaring and recompression steps is stronger in a particular channel in the FIG. 2 arrangement.

In FIG. 3, a third embodiment of the present invention is illustrated to show how the direction-processing function can be distributed in the system. In the arrangement of FIG. 3, the first two delay-line stages are performed by two-dimensional delay lines 18 and 26. Unlike their counterparts in the embodiments of FIGS. 1 and 2, however, the delay lines 18 and 26 of FIG. 3 have focal lines neither at the longitudinal centers of the delay lines nor at their output edges. Instead, their focal lines lie outside the delay lines; the focal distances R of these delay lines are twice their lengths L. Accordingly, while delay line 18 of FIG. 3 performs time compression in the same manner as the correspondingly numbered delay lines of FIGS. 1 and 2 do, and while delay line 26 performs the same time re-expansion, neither alone performs the position processing. Instead, the position processing is begun in delay line 18 and completed in delay line 26. Thus, the outputs of delay line 18 correspond neither to specific inputs nor to specific spatial-frequency components; they merely represent the interference patterns that occur halfway through the focusing process. In the arrangement of FIG. 3, therefore, the antenna gain does not benefit the limiting process, but it still benefits the squaring step, in which the benefit of the antenna gain is more important.

Separate parallel one-dimensional delay lines 34a–d perform the final compression step in FIG. 3. As in the previous two embodiments, the final compression step in the embodiment of FIG. 3 is performed by delay lines in which the ratio of frequency difference to delay difference is minus twice the time rate of change of frequency translation in the mixers 16a–d. Separate delay lines are illustrated in FIG. 3 because their use is acceptable at this point; the direction processing has already occurred, and the phase relationships among the signals is no longer as critical. As a practical matter, however, a two-dimensional delay line is preferable because a single two-dimensional delay line is usually less expensive than several separate one-dimensional lines. Such a delay line would perform no direction processing—i.e., it would be one in which the focal length is half the delay-line length.

All of the embodiments described so far are arranged to process the outputs of a linear antenna array—that is, an array in which the array elements are physically positioned in a straight line. However, the outputs of circular and other types of arrays can also be processed by employing the teachings of the present invention, as FIG. 4 indicates.

In FIG. 4, the elements 10a–d of the array are arranged in a circle, but the outputs are still applied to a compressive receiver 40. For the sake of simplicity, the mixers 12a–d, the local oscillator 14, the weighting filters 16a–d, and the first two-dimensional delay line 18 shown explicitly in FIGS. 1–3 are represented simply as a compressive receiver 40. In this embodiment, the first delay line 18, which is part of the compressive receiver 40 and not shown separately in FIG. 4, has a focal length equal to its delay-line length, so it performs both temporal and spatial Fourier transformations. As in the previous arrangements, any strong narrow-band signals are removed by limiters 24a–d.

In order to process the outputs of a circular array properly, however, we employ the teachings of U.S. Pat. application Ser. No. 536,477 of John T. Apostolos, filed on Sept. 28, 1983, for a Two-Dimensional Acquisition System Using Circular Array. The details of that application, which are hereby incorporated by reference, will not be repeated here. Briefly, however, the outputs of the limiters are processed by correction circuits consisting of mixers 41a–d and function generator 42. Since the compressive receiver 40 performs a two-dimensional Fourier transformation in time and antenna-element position, each of the outputs of the compressive receiver is associated with a spatial-frequency component. As the Apostolos application teaches, the function generator 42 applies to each output a time-dependent correction function that differs only in the absence of the physical-angle-dependent phase factor from the reciprocal of the antenna pattern that would result if the antenna elements radiated signals whose temporal frequency is the temporal frequency associated with the time during the sweep when the associated mixer 41a, b, c, or d receives the output and whose phases advance with element position at the spatial frequency associated with that particular compressive-receiver output.

For a single-frequency plane wave reaching the circular array from a given angle, the outputs of the mixers 41a–d together constitute an ensemble of signals whose phase advance between consecutive mixer outputs is proportional to the bearing angle of the source of the plane wave and independent of its temporal frequency. To obtain a direction indication, then, a Butler matrix 43, which performs a spatial Fourier transformation, processes the ensemble of signals so that the position of the output port 44a, b, c, or d at which an output pulse occurs indicates the direction of the signal source that caused the output. Unlike the direction indication of the previous embodiments, this is a direct direction indication, not an indication of spatial frequency, so no compensation for temporal frequency is needed.

The Butler-matrix outputs are re-expanded in a two-dimensional delay line 26. The length of delay line 26 in FIG. 4 is twice its focal length, so it re-expands temporal-frequency components without affecting their position information. The squaring function is then performed by squaring circuits 32a–d, and two-dimensional dispersive delay line 34 recompresses components in time without affecting the segregation according to direction.

It was observed that the position of the Butler-matrix output port on which a given component predominates is a direct indication of the direction of the source, rather than an indication of the spatial frequency at the antenna array. Aside from eliminating the need to take temporal frequency into account in order to determine the bearing of a source, this feature has the additional advantage that its squaring step can benefit from the array gain even in systems having high numbers of antenna elements and of corresponding parallel channels.

Since spatial frequency depends not only on the bearing angle of a source but also on the temporal frequency at which the source radiates, a spread-spectrum signal causes the outputs of a linear antenna array to have a range of spatial frequencies. In systems in which the number of antenna elements is not high, this does not present a problem, because the range of spatial frequencies carried by a single output of the spatial transformation is still wide enough that a single channel will carry signals representing substantially the entire frequency content of the spread-spectrum signal. As the number of antenna elements becomes larger, however, the spatial-frequency range of a given channel becomes narrower, so the frequency range of the spread-spectrum signal becomes significant in systems of the type illustrated in FIGS. 2 and 3. Specifically, in the versions of FIGS. 2 and 3, the results of the spread-spectrum signal would be divided among several squaring circuits 32, each of which would receive only a portion of the spectrum of the spread-spectrum signal. The result would be that the squaring circuits could not effectively perform their function of squeezing the spread-spectrum signal into a narrow band.

In contrast, resultant signals from sources at a given bearing angle in the FIG. 4 arrangement predominate in a particular squaring circuit regardless of temporal frequency. Thus, the squaring step in the arrangement of FIG. 4 benefits from the antenna gain even when the number of antenna elements is high. In the system of FIG. 1, in which direction processing occurs only after squaring so that the entire spectrum of the spread-spectrum signal is present in the inputs of all of the squaring circuits 32, the squaring function can be carried out effectively for large numbers of antenna elements, too, but neither the limiting nor the squaring process benefits from the array gain.

Some improvement to the arrangement of FIG. 1 can be made without eliminating its ability effectively to process outputs of antenna arrays that have large numbers of elements. Such an improvement is illustrated in FIG. 5, in which elements corresponding to those of FIG. 1 have corresponding reference numerals.

The difference between the systems of FIGS. 1 and 5 is that the focal lengths of the two-dimensional delay lines 18 and 26 are equal to their delay-line lengths in FIG. 5, while those focal lengths are half the delay-line lengths in FIG. 1. Delay line 18 of FIG. 5 accordingly performs a spatial Fourier transformation in addition to its temporal Fourier transformation. This gives the benefit of the antenna gain to the limiting process performed by limiters 24a-b. Since the limiting function is used to eliminate narrow-band signals and not to affect the spread-spectrum signal, no problem is presented by the fact that, in systems having high numbers of array elements, only portions of the spread-spectrum signal are present in each channel of the limiting process.

Delay line 26 performs a reverse spatial transformation so that the entire spectrum of the spread-spectrum signal is again present in each channel. As was mentioned above, this is necessary in order to make the squaring process effective in systems having high numbers of antenna elements. After squaring circuits 32 carry out the squaring process, the final delay line 34 performs the spatial Fourier transformation again to provide a direction indication. Since the squaring process has squeezed the spread-spectrum signal into a narrow frequency band at this point, the spatial Fourier transformation performed by the final delay line 34 causes the results of any spread-spectrum signal to predominate in only one or two output ports. Accordingly, the FIG. 5 arrangement has the FIG. 1 benefit of operating effectively on the outputs of arrays with large numbers of elements and has the additional advantage that the limiting process benefits from the array gain.

It is thus apparent that the teachings of the present invention can be used in a wide variety of spread-spectrum systems employing multi-element antenna arrays. Not only can they be used in the several ways described above, but they can also be used in other applications. In particular, although all of the illustrated embodiments were systems for identifying signals from several sources simultaneously, there is no need to employ the teachings of the present invention in such elaborate systems. A single-direction system that processes the signals from only one of the output ports 22a-d, for instance, can also use the teachings of the present invention. Other uses of the foregoing teachings will also be apparent to those skilled in the art.

We claim:

1. A system for detecting spread-spectrum signals in the antenna-element outputs of a plurality of antenna elements in a multi-element antenna array, the system comprising:

A. a two-dimensional compressive receiver comprising:

i. a plurality of input ports, each of which is associated with a different antenna element and connected to receive the antenna-element output from its associated antena element;

ii. at least one output port;

iii. a linearly sweeping local oscillator for producing a chirp signal;

iv. at least one mixer, each associated with a different input port, and connected to receive the chirp signal and the antenna element output associated with an input port, thereby providing a plurality of chirped input signals;

v. a plurality of weighting filters, each associated with a different mixer and connected to receive as an input the chirped input signal, thereby providing a plurality of weighted output signals;

vi. two-dimensional dispersive delay line means including a common delay-line medium through which the weighted output signals propagate to produce at the at least one output port a compressed output in which components that result from antenna-element output components of a given frequency within a compressive-receiver frequency band are compressed together in time and in which components that result from antenna-element components of different frequencies in the band are separated in time, all the signals in the two-dimensional dispersive delay line means being superimposed in propagating through the common delay-line medium to the at least one output port;

B. a limitor circuit associated with each of the at least one output port of the two-dimensional compressive receiver and connected to receive the compressed output of its associated output port, each limiter circuit producing a limiter output in which any portion of the received compressed signal above a threshold amplitude is eliminated, the contributions of strong narrow-band antenna-output components to each limiter-circuit output thereby being reduced from their contributions to the associated compressive-receiver output throughout the compressive-receiver frequency band; and C. a spread-spectrum processor circuit for detecting the results of antenna-element spread-spectrum signals in the at least one limiter output.

2. A system as defined in claim 1 wherein the spread-spectrum processor circuit includes:

A. second dispersive delay line means connected to receive each of the at least one limiter output, the relationship of delay to frequency in the second dispersive delay line means being the reverse of that of the first-mentioned dispersive delay line so that it produces at least one re-expanded output in each of which the signal components resulting from narrow-band antenna-element signal components are re-expanded in time;

B. a power-law circuit, connected to receive the at least one re-expanded output, for producing a power-law output associated with each re-expanded output, the instantaneous amplitude of each power-law output being proportional to a predetermined power of the amplitude of its associated re-expanded output; and C. third dispersive delay line means connected to receive the at least one power-law output and producing at least one recompressed output, the ratio of frequency difference to the resultant delay difference in the third dispersive delay line means being that of the first dispersive delay line means multiplied by the power of the power-law circuit so that the third delay line means time compresses any components of a power-law output caused by spread-spectrum signals in the antenna-element outputs generated by frequency shifts of 360° divided by the power of the power-law circuit.

3. A system as defined in claim 2 in which
A. the two-dimensional compressive receiver includes a plurality of output ports;
B. the second two-dimensional dispersive delay line means produces a plurality of re-expanded outputs;
C. the third two-dimensional dispersive delay line means produces a plurality of recompressed outputs wherein each recompressed output comprises a plurality of comonents, each component caused by an antenna-element output of a given frequency, from a given source, and each component having a different amplitude in different recompressed outputs, so that the recompressed output in which the amplitude of the component is greatest depends on the bearing angle of the given source.

4. A system as defined in claim 3 in which the third two-dimensional dispersive delay line means produces a plurality if recompressed outputs wherein each recompressed output is associated with a different spatial frequency and in which each recompressed output has a plurality of components, each component indicating a spread-spectrum antenna-element signal having a given center temporal frequency and a given spatial frequency, so that the recompressed-output component whose amplitude is greatest in the recompressed output associated with the spatial frequency to which the given spatial frequency is closest.

5. A system as defined in claim 4 in which each re-expanded output is associated with a different spatial frequency and in which re-expanded output components caused by antenna-element components of a given spatial frequency have the greatest amplitudes in the re-expanded output associated with the spatial frequency to which the given frequency is closest.

6. A system as defined in claim 5 in which the first two-dimensional delay line means performs a spatial Fourier transformation.

7. A system as defined in claim 5 in which the first and second two-dimensional delay line means together perform a spatial Fourier transformation.

8. A system as defined in claim 4 in which the third two-dimensional delay line means performs a spatial Fourier transformation.

9. A system as defined in claim 4 in which each of the first, second, and third two-dimensional delay line means performs a spatial Fourier transformation.

10. A system as defined in claim 4 in which

A. the first two-dimensional delay line means performs a spatial Fourier transform;
B. the second two-dimensional delay line means performs a reverse spatial Fourier transform; and
C. the third two-dimensional delay line means performs a spatial Fourier transform.

11. A system as defined in claim 1 wherein the spread-spectrum processor circuit further comprises:
A. at least one function generator, for generating at a function generator output, a time-dependent corrention function for each limiter output, the correction function dependent upon the reciprocal of the multi-element antenna array's temporal and spatial frequncy response;
B. at least one post-limiter mixer, associated with and operably connected to each limiter output and also operably connected to its associated function generator output, each post-limiter mixer thereby producing a post-limiter mixer output in which the phase advance is proportional to the direction of the spread spectrum signal and independent of its temporal frequency;
C. a Butler matrix for performing a spatial transformation, having an input port associated with and operably connected to each post-limiter mixer output, thereby producing, at a plurality of output ports, at least one matrix output wherein the position of the output port at which any components of a post-limiter mixer output caused by spread-spectrum signals in the antenna-lement outputs depends upon the direction of the spread-spectrum signal;
D. a second dispersive delay line means connected to receive each of the at least one Butler matrix outputs, the relationship of delay to frequency being the reverse of the first-mentioned dispersive delay line so that it produces at least one re-expanded output, in each of which the signal components resulting from narrow-band antenna-element signal components are re-expanded in time;
E. at least one power-law circuit, connected to receive the at least one re-expanded output, for producing a power-law output associated with each re-expanded output, the instantaneous amplitude of each power-law output being proportional to a predetermined power of the amplitude of its associated re-expanded output; and
G. third dispersive delay line means connected to receive the at least one power-law output and producing at least one recompressed output, the ratio of frequency difference to the resultant delay difference being that of the first mentioned dispersive delay line means multiplied by the power of the power-law circuit so that the third delay line means times compresses any components of a power-law output caused by spread-spectrum signals in the antenna-element outputs generated by the frequency shifts of 360 divided by the powere of the power-law circuit.

12. A system for detecting spread-spectrum signals comprising:
A. a plurality of antenna elements arranged as an antenna array, which generated at antenna element outputs, a plurality of antenna element output signals;
B. a two-dimensional compressive receiver operably connected to the antenna element outputs at a plurality of input ports, each input port associated with one of the antenna element outputs, for generating a plurality of time compressed signals at a plurality of two-dimensional compressive receiver output ports, the number of compressive receiver input ports not necessarily equal to the number of compressive reciver output ports;

C. a plurality of limiter circuits, each associated with one of the compressive receiver output ports, for generating a plurality of limiter outputs in which any portion of a compressive receiver output above a threshold amplitude is eliminated; and D. a spread-spectrum processor circuit for detecting the spread spectrum signals present in at least one of limiter the outputs.

13. A system as defined in claim 12 wherein the antenna elements are arranged as a linear array.

14. A system as defined in claim 12 wherein the antenna elements are arranged as a circular array.

* * * * *